Dec. 20, 1932.  W. O. COLLINS  1,891,800
ATTACHMENT FOR INCUBATORS
Filed April 6, 1931   2 Sheets-Sheet 1
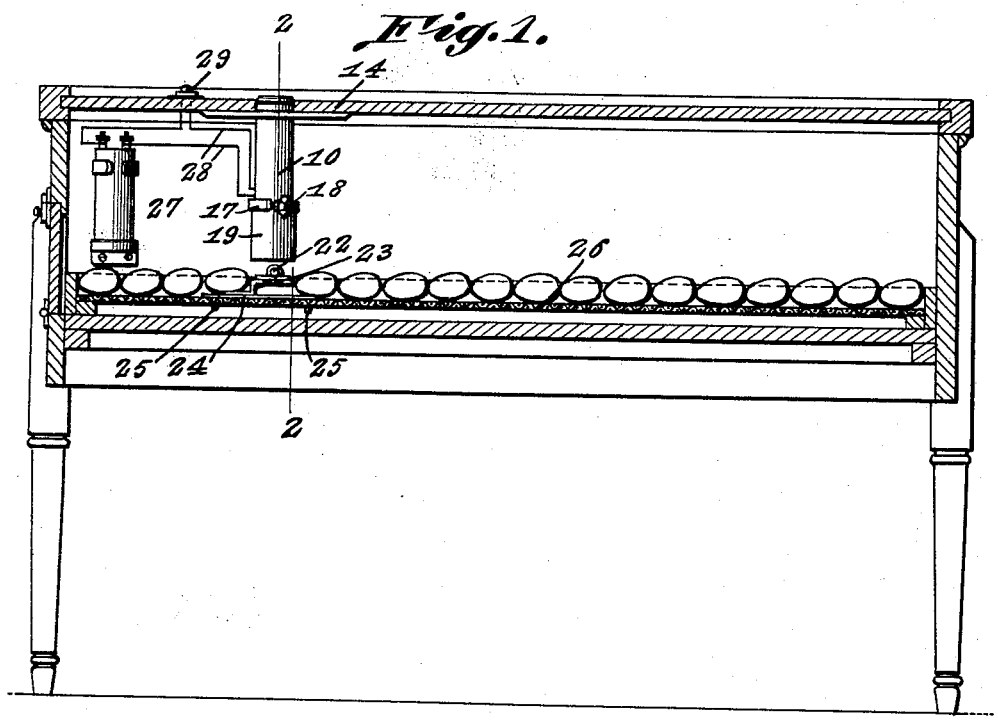
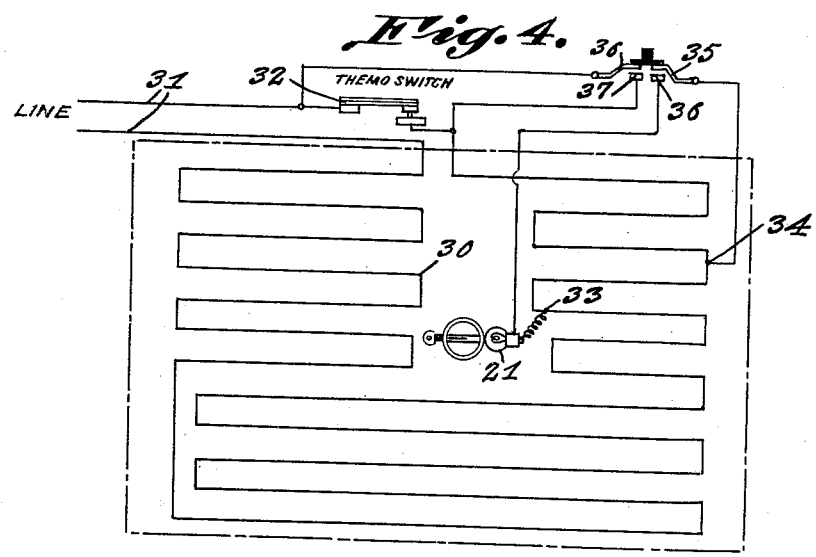
W. O. Collins, INVENTOR
BY Victor J. Evans and Co.  ATTORNEYS Dec. 20, 1932.  W. O. COLLINS  1,891,800
ATTACHMENT FOR INCUBATORS
Filed April 6, 1931  2 Sheets-Sheet 2
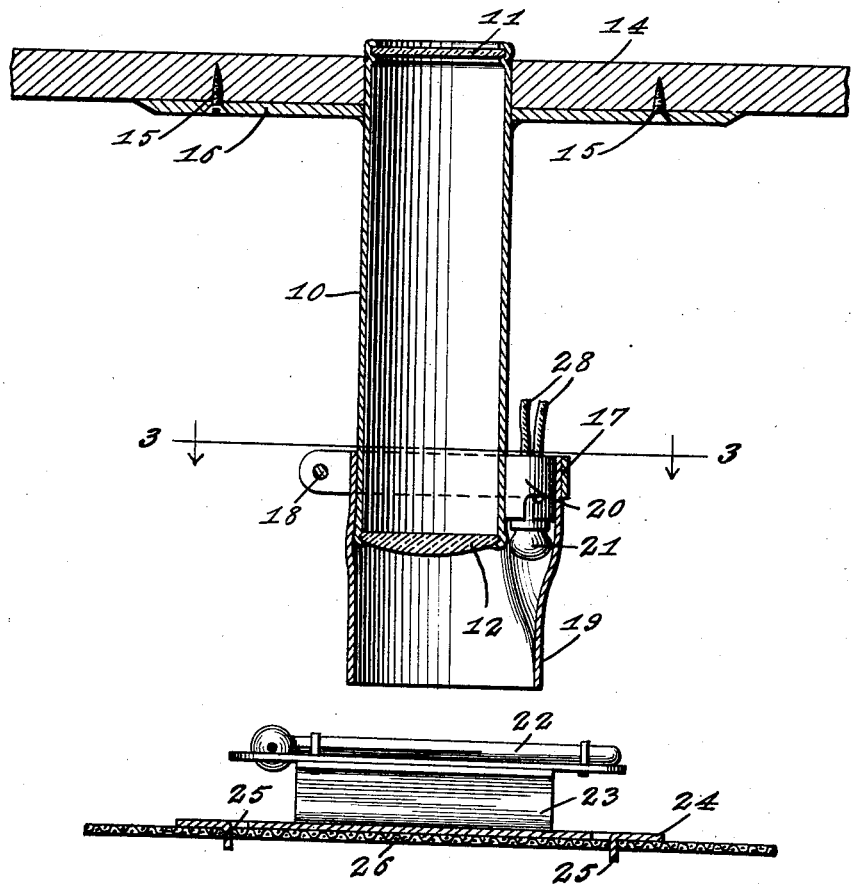
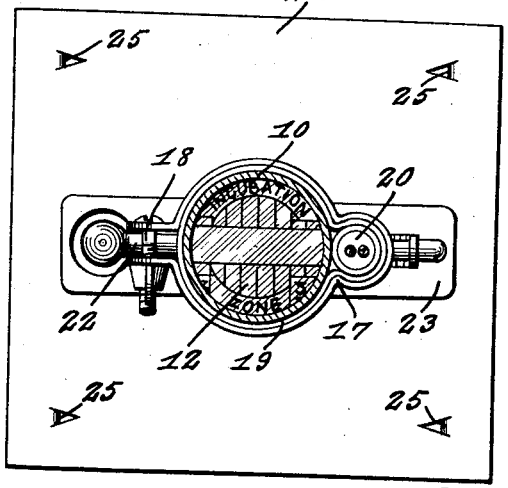
W. O. Collins,
INVENTOR
BY Victor J. Evans
and Co  ATTORNEYS Patented Dec. 20, 1932

1,891,800

UNITED STATES PATENT OFFICE

WILLIAM O. COLLINS, OF WELLSVILLE, KANSAS

ATTACHMENT FOR INCUBATOR

Application filed April 6, 1931. Serial No. 528,180.

The object of the invention is to provide a means for incorporation in incubators, whereby the temperature conditions in the latter may be promptly ascertained by a very simple inspection; to provide a thermometer support for placement in the egg tray and of a character to be readily retained in place therein; and to provide an observation means for the thermometer readily illuminated at the time it is desired to make an inspection.

With this object in view the invention consists in a construction and combination of parts of which a preferred embodiment is illustrated in the accompanying drawings and to which the invention is not to be restricted. The right is reserved to make such changes or alterations as the actual reduction to practice may suggest in so far as such changes or alterations are comprehended by the appended claims.

Figure 1 is a longitudinal sectional view through an incubator showing the invention applied in operative position.

Figure 2 is a vertical sectional view on the plane indicated by the line 2—2 of Figure 1.

Figure 3 is a transverse sectional view on the plane indicated by the line 3—3 of Figure 2.

Figure 4 is a diagrammatic view showing the method of energizing the lamp on electrically operated incubators.

While requiring no modification of the conventional incubator for its application, the invention is designed as a permanent attachment for the latter and consists of a tube 10 carrying a lens 11 at its upper end and a magnifying lens 12 at its lower end. The tube 10 is designed to extend through the top 14 of the incubator and the only modification of the latter necessary is the boring of the hole for this tube. The tube is retained in position by means of fastening screws 15 passing through a supporting plate 16 to which the tube is secured.

Adjacent the lower end, the tube is surrounded with a clamp 17 diametrically contractible by means of a screw 18 so that the clamp may be brought into firm binding engagement with the tube and thus retain in place the flexible extension 19. The clamp 17 also serves as a means for supporting the lamp socket 20 in which is carried a small lamp bulb 21.

A thermometer 22 is carried by an angularly bent plate 23 which in turn is secured to a base plate 24, the latter having punched from it the spurs 25 which are turned downwardly, so that they may engage in the meshes of the reticulated bottom 26 of the egg tray. By reason of the spurs 25, the base plate 24 may be positioned directly below the tube 10 and there will be no danger of its lateral displacement because of the spurs engaging the meshes of the tray. Also, the eggs surrounding the thermometer will tend to keep its base plate in firm contact with the tray bottom.

Since the thermometer is disposed directly below the inspection tube, when the lamp 21 is lighted, the thermometer is fully illuminated and it is possible to quickly ascertain the temperature of heat in the incubator, the thermometer being magnified by the lens 12.

Illumination of the lamp 21 may be had by means of a battery 27 which may be appropriately supported on the wall of the incubator. This battery is directly connected with the lamp by means of the leads 28 in one of which is interposed a push button switch 29, the latter being mounted in the top wall of the incubator, preferably adjacent the tube 10. The battery may be mounted either inside or outside the incubator. It may be found preferable sometimes to mount it outside, although in the illustrated embodiment, it is shown interior to the incubator.

The flexible extension 19 of the inspection tube serves as a means to keep chicks from climbing on top of and thereby obscuring the thermometer. Also, while constituting an extension for the inspection tube, it is yieldable to any obstruction that it may meet in withdrawing the egg tray.

Where incubators are electrically operated, the inspection lamp 21 may be energized from the electric circuit. A diagrammatic plan of this arrangement is illustrated in Figure 4. The heating resistance 30 is energized from the line indicated at 31 in one leg of which is interposed a thermostatic switch 32. The resistance is tapped as indicated at 33 and 34, the tap 33 being carried to one terminal of the lamp 21 and the tap 34 to one of the movable contacts 35 of a double contact switch. The contact 36 which is the fixed companion contact to contact 35 is connected to the other terminal of the lamp while the corresponding contact 37 is connected to one terminal of the resistance 30 to which the thermostatic switch is also connected. The movable contact 36 is connected to that lead of the line in which the thermostatic switch is included but ahead of the thermostatic switch. By this means, when the light switch is closed, the lamp is in shunt with the resistance 30 between the points 34 and 33 and current is always available irrespective of whether the thermostatic switch is open or closed. When the light switch is closed current passes from the line to the contact 36, thence contact 37 to one terminal of the resistance 30, thence to the tap 34, where it divides, part passing to the contact 35, thence to contact 36, through the lamp tap 33 and then through the remainder of the resistance back to the line.

The invention having been described, what is claimed as new and useful is:—

1. Means for the purpose indicated comprising a pendent tube provided with a lens at its lower end, and a lamp carried by the tube as a lateral attachment to the latter adjacent the lens to illuminate an object placed below the tube, the tube having a flexible tubular extension below the plane of the lens and the rays from the lamp passing through said extension onto the object under observation.

2. Means for the purpose indicated comprising a pendent tube provided with a lens at its lower end, a lamp carried by the tube as a lateral attachment to the latter adjacent the lens to illuminate an object placed below the tube, the tube having a flexible tubular extension below the plane of the lens and the rays from the lamp passing through said extension onto the object under observation, and a clamp contracted into binding engagement with the tube to support the lamp and retain the extension.

In testimony whereof I affix my signature.

WILLIAM O. COLLINS.